No. 754,436. PATENTED MAR. 15, 1904.
T. H. DUNCOMBE.
BALL BEARING.
APPLICATION FILED DEC. 19, 1902.
NO MODEL.
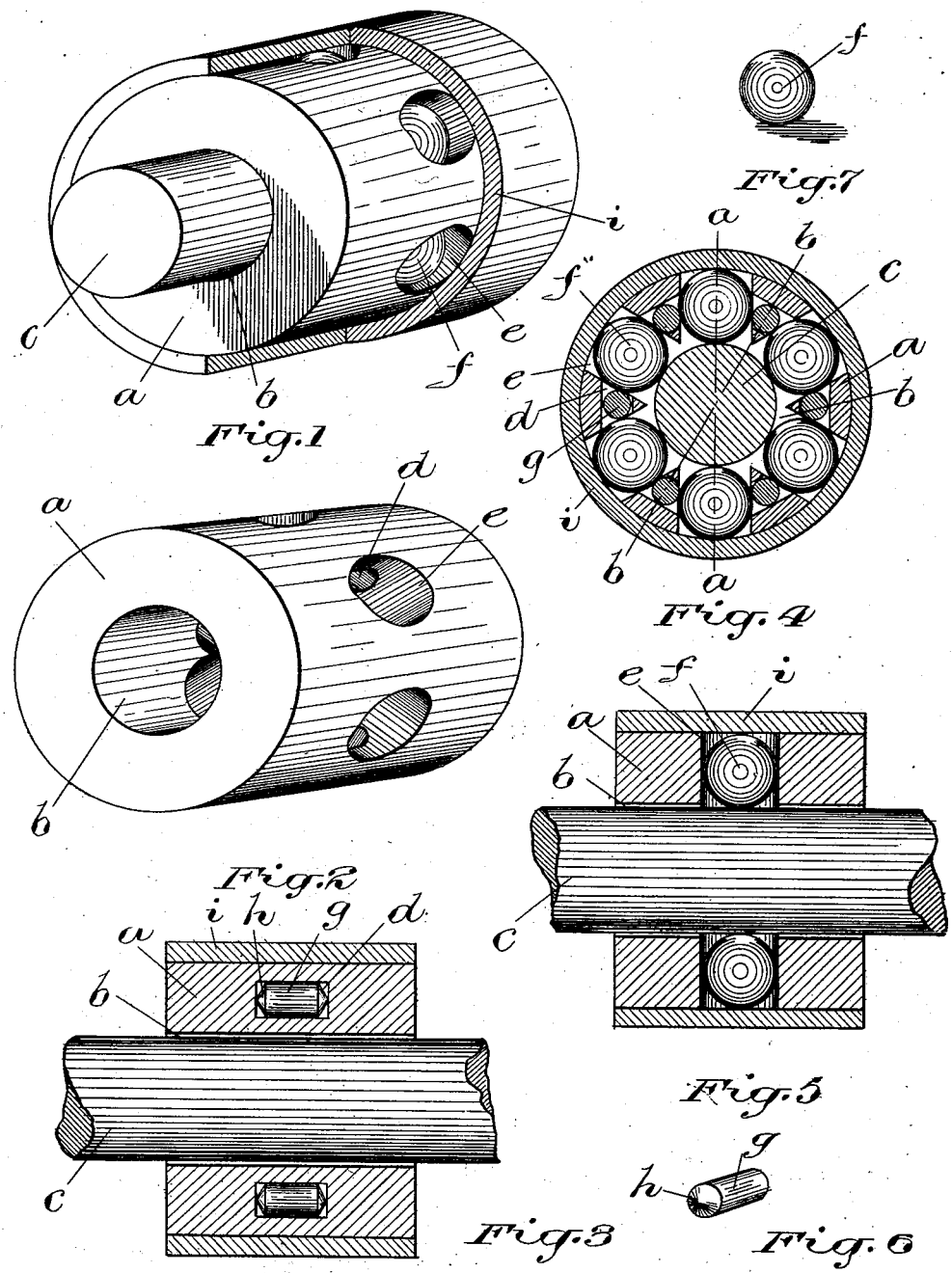
Witnesses
M. Greer
S. Alfred Jones
Inventor
Tyrrell Hubert Duncombe,
by his attorneys
Smith Hamlin No. 754,436. Patented March 15, 1904.

UNITED STATES PATENT OFFICE.

TYRRELL HUBERT DUNCOMBE, OF ST. THOMAS, CANADA.

BALL-BEARING.

SPECIFICATION forming part of Letters Patent No. 754,436, dated March 15, 1904.

Application filed December 19, 1902. Serial No. 135,912. (No model.)

*To all whom it may concern:*

Be it known that I, TYRRELL HUBERT DUNCOMBE, chemist, of the city of St. Thomas, in the county of Elgin, in the Province of Ontario, Canada, have invented certain new and useful Improvements in Ball-Bearings; and I do hereby declare that the following is a full, clear, and exact description of the same.

This invention relates to an improved ball-bearing in which the balls are carried in a solid ring mounted on the shaft and each ball being carried in a separate opening, thus doing away with the circumferential ball-race, in which there is considerable binding and friction. The balls are so arranged in the bearing that any ball can be removed or replaced without interfering with the other balls. I attain these objects by the illustrations in the accompanying drawings, in which—

Figure 1 is a perspective view of the bearing partially broken away to show the balls. Fig. 2 is a perspective view of the retaining-ring. Fig. 3 is a longitudinal section on lines $b\ b$, Fig. 4. Fig. 4 is a cross-sectional view of the bearing. Fig. 5 is a longitudinal view on lines $a\ a$, Fig. 4. Fig. 6 is a perspective view of one of the antifriction-rollers. Fig. 7 is a view of one of the balls.

Like letters refer to like parts throughout the specification and drawings.

$a$ is the retaining-ring, through which passes the circular bore $b$ to receive the rotatable shaft $c$. Passing through the ring $a$ at predetermined intervals are a series of circular openings $e$, and connecting each two openings is an oblong passage $d$. Carried in each of the circular openings $e$ is an antifriction-ball $f$, and in each of the passages $d$ is an antifriction-roller $g$. Each roller is in frictional contact with two balls, which are free to revolve together. The ends $h$ of the roller $g$ terminate in a point and bear against the inner faces of the ends of the passages $d$, thus obviating considerable friction. Surrounding the ring $a$ is a metal sleeve $i$, which retains the balls in the openings. The sleeve $i$ may be fastened to the ring $a$ in any suitable manner. In operation the balls $f$ bear against the periphery of the shaft $c$ and the inner face of the sleeve $i$.

I do not wish to confine myself to any specified number of balls or rollers or to the exact shape of the openings in the ring to contain the balls, as I may make slight changes without deviating from the nature of my invention.

What I claim as new, and desire to secure by Letters Patent, is—

1. In a ball-bearing, a retaining-ring formed in one piece, said retaining-ring having a series of openings forming a series of projections, there being passages in said projections between said openings, antifriction-balls in said openings, and antifriction spacing-rollers in said passages, substantially as specified.

2. In a ball-bearing, a retaining-ring formed in one piece, said retaining-ring having a series of circular openings forming a series of projections, there being passages in said projections between said openings, antifriction-balls in said openings, and antifriction spacing-rollers in said passages, the said rollers being in frictional contact with the said balls, a circular sleeve surrounding the said retaining-ring, substantially as specified.

St. Thomas, September 17, 1902.

TYRRELL HUBERT DUNCOMBE.

Witnesses:
W. K. CAMERON,
BESSIE GILBERT.